P. BURKE.
Mode of Planting Posts.
No. 33,335.
Patented Sept. 24, 1861.
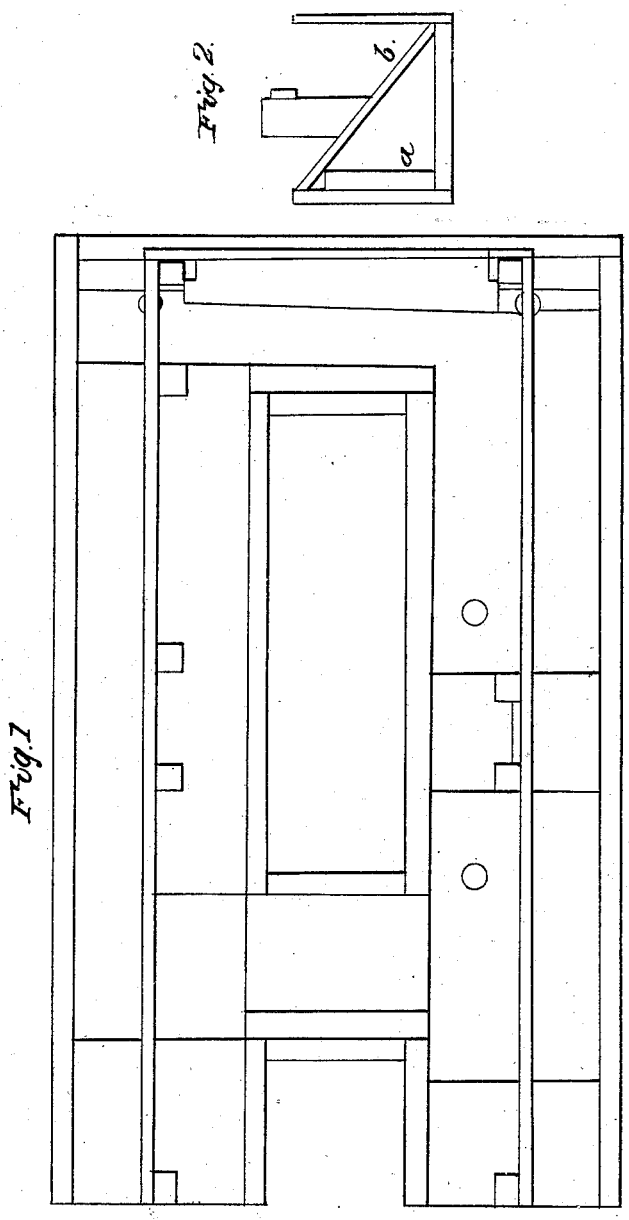
WITNESSES
INVENTOR

UNITED STATES PATENT OFFICE.

PATRICK BURKE, OF HELENA, NEW YORK.

IMPROVED METHOD OF SETTING POSTS.

Specification forming part of Letters Patent No. 33,335, dated September 24, 1861.

*To all whom it may concern:*

Be it known that I, PATRICK BURKE, of Helena, in the county of St. Lawrence and State of New York, have invented certain new and useful Improvements in the Mode of Planting Posts for the Purpose of Preserving them from Decay; and I do hereby declare that the following is a clear, full, and exact description of the same, reference being had to the accompanying drawings and the letters of reference marked thereon.

The nature of my invention consists more in the precise order in which the materials hereinafter named are used than in the employment of the materials themselves.

To enable others skilled in the art to make and use my invention to the best advantage, I will now describe the mode of planting posts which I have found of all others to be the best for preserving their bottoms from decay.

I first dig a drain or trench around the field I wish inclosed. I then commence, and at the interval at which the posts should be set I place in said ditch in a slanting position flat stones for the posts to rest upon, which is represented by *b* in Figure 2.

*a* represents a stone set perpendicularly up against the side of the ditch for the support of stone *b*, as fully seen in Fig. 2. The bottom of the post should be beveled to suit the inclination of the stone, thus giving it a firmer foundation, and is also an effective remedy against water collecting around the bottom of the post. Thus far I claim nothing as new, as posts have been set this way before.

My mode of filling in is as follows: I first pack small stones around the bottom of the post to the height of about one foot. I then throw in a suitable quantity of cedar-bark, or, if not convenient, shavings or straw will answer. Upon this is placed sod with green side under, and then finish up with loose soil, which should be well packed and slanting on all sides from the post.

It is well known that the action of the frost upon the post below the ground is very injurious. My object has therefore been to guard against this difficulty by filling in with such substances as would prevent as far as possible the frost from penetrating to the bottom of the posts, which when done will be evinced in a very short time by the posts being heaved up, as it were, from the earth. Thus they become loosened in their beds, which when once done water sinks to their bottoms and decay rapidly follows.

By a course of experiments I have shown that posts planted by my method will last longer than when planted in any other way yet known. And Now what I claim, and desire to secure by Letters Patent, is—

The employment of the different materials herein named for planting posts when used in the successive order specified and in connection with the foundation, as herein set forth.

PATRICK X BURKE.
his mark

Attest:
H. F. DENIO,
A. DENIO,